US007992739B2

(12) United States Patent       (10) Patent No.:     US 7,992,739 B2
     Garcia                     (45) Date of Patent:    Aug. 9, 2011

(54) COLLAPSIBLE FRAME CONTAINER (76) Inventor: Rodolfo Garcia, Los Angeles, CA (US)

( * ) Notice: Subject to any disclaimer, the term of this patent is extended or adjusted under 35 U.S.C. 154(b) by 702 days.

(21) Appl. No.: 11/607,164

(22) Filed: Dec. 1, 2006

(65) Prior Publication Data
     US 2008/0128413 A1   Jun. 5, 2008

(51) Int. Cl.
     B65D 6/16   (2006.01)
     B65D 8/14   (2006.01)
     B65D 88/00  (2006.01)
(52) U.S. Cl. .................... 220/7; 220/6; 220/1.6
(58) Field of Classification Search .......... 220/4.01,
     220/FOR. 116, FOR. 115, FOR. 112, 7, 908.1,
     220/908, 676, 660, 666, 495.06, 495.01;
     206/577, 223, 216, 546; 383/12; B65D 30/10,
     B65D 33/02, 6/16, 8/14
     See application file for complete search history.

(56)              References Cited
           U.S. PATENT DOCUMENTS 608,998 A *  8/1898  Apthorp .................. 220/9.2
    858,488 A *  7/1907  Tynes .................... 220/9.2
  1,103,646 A *  7/1914  Baddeley ................ 229/199
  2,020,766 A * 11/1935  Brown ................... 280/639
  2,874,813 A *  2/1959  Bunte ................... 190/109
  3,937,363 A *  2/1976  Anderson ............... 222/105
  4,771,917 A *  9/1988  Heaps et al. ............. 222/92
  4,850,506 A *  7/1989  Heaps et al. ........... 229/117.3
  4,923,087 A *  5/1990  Burrows ............... 220/495.1
  4,934,636 A *  6/1990  Orlosky et al. ........... 248/95
  5,027,748 A *  7/1991  Wolak .................. 119/168
  5,437,384 A *  8/1995  Farrell ................. 220/1.5
  6,000,549 A * 12/1999  Perkins ................. 206/596
  6,176,455 B1 * 1/2001  Ma ..................... 248/101
  6,516,965 B1 * 2/2003  Perkins ................. 220/9.4

FOREIGN PATENT DOCUMENTS
  GB        2246336 A  *  1/1992
  JP        03051202 A  *  3/1991
  * cited by examiner Primary Examiner — Anthony Stashick
Assistant Examiner — Robert J Hicks
(74) Attorney, Agent, or Firm — Colin P. Abrahams (57)                    ABSTRACT A collapsible frame container assembly comprises a frame component comprising a plurality of panels connected to each other, the panels being movable relative to each other between a first substantially folded condition wherein the panels are collapsed and a second unfolded condition wherein the panels are opened to define a frame structure. Also provided is a container component comprising first and second sides defining a space therebetween of a size which can be varied according to the relative positions of the first and second sides. The frame component when in the unfolded condition and the container component are releasably coupled to each other to define a predetermined frame container assembly.

23 Claims, 7 Drawing Sheets

COLLAPSIBLE FRAME CONTAINER

FIELD AND BACKGROUND OF THE INVENTION

This invention relates to collapsible frame containers. More particularly, the invention relates to a container comprising a frame, movable between a stored, collapsible condition, and an open condition in which it can form part of a container. The collapsible frame container of the invention may also comprise a kit which comprises a frame component, movable between an open and closed condition, and bag or other type of material used with the frame, the bag and frame being capable of assembly into a portable container.

The collapsible frame container of the invention may be used to create saucers, bowls, cups and the like of various sizes, and may be used by campers to serve food and as a portable water bowl dogs for the convenience of owners. These are examples only of the potential use of the collapsible frame container, as will become apparent from the present specification.

Some other uses of the collapsible frame container include assembly as a urinal, for either men or women, cooking pots, or as a cleanup apparatus for pet litter for use by for dog owners. Moreover, the collapsible frame container of the invention may serve as a portable, collapsible, camper stove.

SUMMARY OF THE INVENTION

According to one aspect of the invention, there is provided a collapsible frame container assembly comprising: a frame component comprising a plurality of panels connected to each other, the panels being movable relative to each other between a first substantially folded condition wherein the panels are collapsed and a second unfolded condition wherein the panels are opened to define a frame structure; and a container component comprising first and second sides defining a space therebetween of a size which can be varied according to the relative positions of the first and second sides, the frame component when in the unfolded condition and the container component being releasably coupled to each other to define a predetermined frame container assembly.

Preferably, the frame component comprises four elongate strips, each separated from each other by a fold, the four elongate strips when in the second unfolded condition, defining a rectangle. The container component may have four edges and the first and second sides are connected to each other on three edges thereof, a fourth edge being open and configured so as to receive the frame component at least in the second, unfolded condition. Conveniently, the fourth edge of the container component has a sealing means for releasably sealing the fourth edge when the frame component is in the space.

In one embodiment, the container component is of larger dimension than the frame component so that the frame component can be received therein, and either the first and second sides of the container component, or a portion thereof, is received within a frame space defined by the frame component when in the second unfolded condition, so as to form a basin therein. Further, the four elongated strips, when in the second unfolded condition, may form a shape consisting of one of the following: square, rectangle, parallelogram.

In one form, the frame component comprises four panels which, in the second unfolded condition, define a frame space having an open upper end and an open lower end, the container component being received within the frame space. The four panels may be separated from each other by longitudinal folds. Preferably, at least one cut-out formed at a fold, and extending into adjacent panels. The cut-out may have an upper edge and a lower edge, the upper edge being angled so that as it extends along a panel it is angled towards the open upper end of the frame component. Further, the container component may have an open edge which folds over the upper open end of the frame component, the open edge being firmly received within the cut-outs so as to secure the container component to the frame component.

In another form, the frame component may comprise two panels which overlie each other and are connected at ends thereof by a fold, the panels being comprised of a resilient material. The frame component may have a frame space and an open upper end and an open lower end, and the container component is received within the frame space of the frame component extending from the open upper end at least to the open lower end. Further, the frame component may have along the fold thereof a cut-out extending from the fold into adjacent panels. The cut-out may have an upper edge which is angled towards the upper open end. Conveniently, the container component folds over the open upper end of the frame component and extends down the outside thereof, the open end of the container component being received within the cut-outs.

In one embodiment, the frame component has an upper edge at the upper end thereof, the upper edge being contoured at least along a portion thereof to operate as a scoop.

In another form of the invention, the frame component is movable between a substantially flat position, which comprises the first folded condition, and a second unfolded condition, configured as a funnel-shaped member, the funnel-shaped member receiving the container component. The frame component may have two apertures formed thereon, the apertures being located on the frame component such that when the apertures are superimposed, the frame component will assume the funnel-shaped configuration. The holes may be dimensioned so as to receive a finger of a user to facilitate holding of the frame component in the funnel-shaped condition.

In yet another embodiment, the frame component comprises four panels, each separated by a fold, and further comprises a plurality of foldable, inwardly extending support arms, which extend towards a center of a frame space defined by the frame component when in the second, unfolded condition, the support arms defining a support surface along at least a portion of their length. The frame component is preferably comprised of a metal or other suitable material able to withstand high temperatures. In such an embodiment, the container component may fit over an upper edge of the frame component and extends into the frame component up to a depth such that the container component is positioned over the support surface.

According to another aspect of the invention, there is provided a frame component for a collapsible frame container assembly, the frame component comprising a plurality of panels connected to each other, the panels being movable relative to each other between a first substantially folded condition wherein the panels are collapsed and a second unfolded condition wherein the panels are opened to define a frame structure, the frame component when in the unfolded condition being releasably connectable to a container component to define a predetermined frame container assembly.

According to yet another aspect of the invention, there is provided a method of forming a collapsible frame container assembly, the method comprising forming a frame component comprising a plurality of panels connected to each other and moving the panels relative to each other between a first substantially folded condition wherein the panels are collapsed and a second unfolded condition wherein the panels are opened to define a frame structure; and coupling the frame component to a container component comprising first and second sides defining a space therebetween of a size which can be varied according to the relative positions of the first and second sides, the frame component when in the unfolded condition and the container component being releasably coupled to each other to define a predetermined frame container assembly.

According to one aspect of the invention, there is provided a collapsible frame container comprising a frame component foldable between a collapsed stored position and a predetermined or selected open position, and a bag component for receiving the frame component when in the open position, the configuration of the bag component being at least in part determined by the configuration of the frame component when in the open position.

Preferably, the frame component may also be received for storage purposes within the bag component when the frame component is in the collapsed or stored position. The collapsible frame container, in accordance with one aspect of the invention, is therefore configured in a stored position with the frame collapsed and located within the container for easy storage and carrying, and an open or operative position wherein the frame is unfolded to a predetermined or selected shape and placed within or about the container so that the frame and container components together form a container or receptacle for use.

In one form of the invention, the frame component may be of rectangular or four sided shape when opened. Thus, the frame component may comprise four side strips, each strip being demarcated from an adjacent strip by a hinge, line of weakness, bend or other suitable structure or characteristic, so that the rectangle may be either folded with the four strips more or less superimposed upon each other in a book-like format, or unfolded so as to define a rectangle and form a space which is defined by the side strips.

When the frame component is rectangular, as described above, it may be folded and stored within the bag component for easy carrying, transportation and the like. When it is desired to configure the frame component and container component into the operative position, the folded frame component may be removed from an opening in the bag component, unfolded into the rectangular shape, and then once more reinserted into the bag component, which may be releasably sealed. The open frame component, when in the bag component, may form a receptacle by having one side of the bag component form a base, and the other side of the bag component, which is over the open frame component, pushed down into the space defined by the rectangle. Thus, the one side of the bag will form a depression or hollow, or basin, within the walls of the frame component, and this basin may be used to accommodate water, food or any other material desired as by the user.

It will this be appreciated that the frame component, when unfolded, and placed within the container component, forms a collapsible and portable receptacle for use. Furthermore, and in accordance with one aspect of the invention, the frame component may be re-used in the future either with the same bag, or, depending upon the user's preference, the used bag may be discarded, and a new bag utilized with the frame each time.

In one form of the invention, such as that described above with respect to a rectangular frame component, the collapsible frame container may form a trough or basin which may, as an example only, comprise a receptacle for water that may be used by a dog owner for the dog.

However, there are very many different configurations of the frame component, limited only by the imagination. Another form of configuration for the frame container in accordance with the invention is to form the frame component as having four sides, with additional height and an open top and bottom. In such a situation, the bag component would be placed in the space defined by the rectangular walls so that the frame component would surround the bag. In one form, the top of the bag would be bent over the rim or lip of the upper portion of the frame component. Preferably, the frame component may comprise apertures or other structural features and shapes which may engage the open end of the bag component when folded over the rim, to prevent it from sliding through. In this arrangement, the frame component and bag component may comprise a portable cup which can be assembled and collapsed as needed. In yet another form, the frame component may have long walls, as described with respect to the cup, but may have specially shaped rim portions so as to allow the user to hygienically pick up dog litter, which would placed in the bag. The bag may thereafter be removed from the frame component, sealed and discarded at the appropriate time.

As will be appreciated, the collapsible frame container has two major components, namely, the frame component which may be moved between an open and collapsed position, and a bag component which may be arranged relative to the frame. When the frame component is in the unfolded position, it will define a shape of various dimensions, and the bag component can be either placed within it, or the frame component placed within the bag, as two examples whereby the combination of the frame component and container component may be assembled to constitute a receptacle or structure of desired shape.

DETAILED DESCRIPTION OF THE INVENTION

A detailed description of various embodiments of the invention will now be described with reference to the accompanying drawings. At the outset, it should be appreciated that the different modifications and variations of the invention are significant, and that the embodiments illustrated and described herein constitute representative examples of the invention and are not in any way to be considered definitive of the scope.

Central to the invention is the use of a collapsible frame component, which is used in conjunction with a container component to form devices of various shapes, configurations and dimensions, and for the purposes of achieving different objectives. As an example of the broad range of application of the invention, one form of the invention can be configured to comprise a portable water trough for a dog, another a pet-litter pick-up device, another a cup, another a urinal device, and yet another, a portable stove. However, the frame component can be shaped in a myriad of different formats for the purposes of achieving an objective.

The frame component is foldable from an open position to a closed or collapsed position which occupies as little space as possible, and is therefore suitable for storage and transportation. The container component preferably comprises a bag, preferably made from plastic, having two corresponding sides which may be joined along three of the edges. Preferably, the sides are not joined along the fourth edge, which is open, and which may preferably include a mechanism for unsealing and resealing the container bag component. Such bags are well known and are commercially available in a significant number of different shapes and sizes, and these may be used with the frame component of the invention, depending upon the configuration, nature and intended use of the combined device formed by the frame component and the container component.

The frame component may preferably include indentations, cut-outs or other structural properties and characteristics which are shaped so as to form an improved connection with the container component, preferably at its open end, and to ensure a more secure and stable connection between the frame component and the container component when in the operational position.

Figure 1:
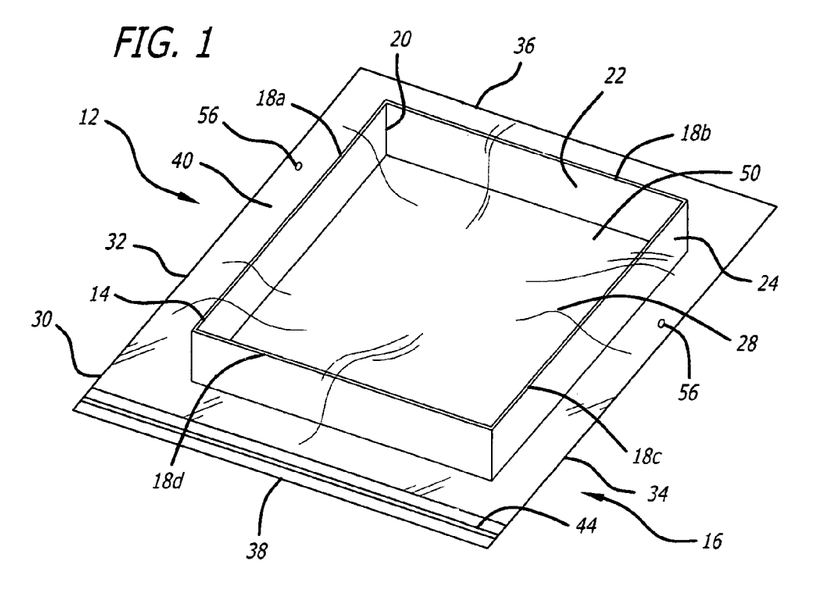
FIG. 1 is a perspective view of a collapsible frame container in accordance with the invention showing the frame component in the open position within the container component.

Reference is now made to FIG. 1 of the drawings, which shows an embodiment of the invention in one of its more simple and straightforward forms. As shown in FIG. 1, there is a trough device 12 comprised of a frame component 14 and a container component 16.

The frame component comprises four elongate strips 18a, 18b, 18c and 18d, each separated by a bend, line of weakness or hinged portion 20. In the embodiment shown in FIG. 1, the hinge 20 in fact comprises a line of weakness or bend in the frame component 14, although any suitable mechanism may be used to facilitate the folding of the elongate strips 18.

Figure 2:
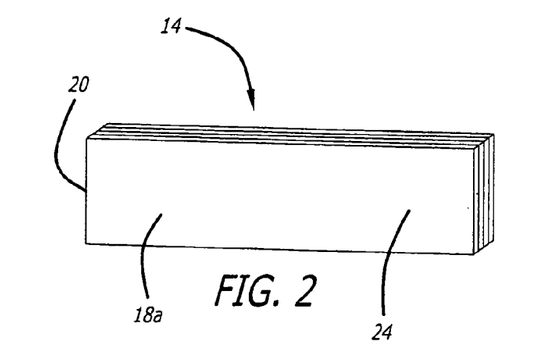
FIG. 2 is a perspective side view of the frame component when in the folded position.
Figure 3:
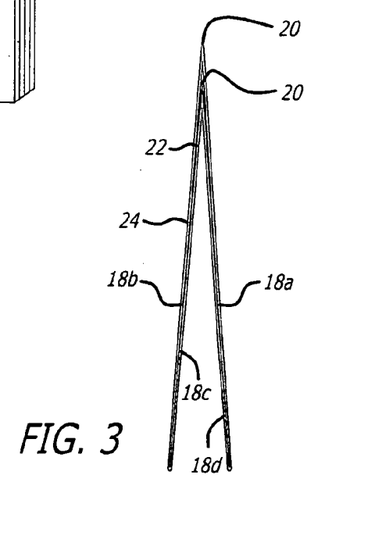
FIG. 3 is an end view of the substantially folded frame component shown in FIG. 2.

Each elongate strip has an inner surface 22 and an outer surface 24. The frame component 14 is capable of being folded along its hinges into a relatively flat configuration, as shown in FIGS. 2 and 3 of the drawings. FIG. 2 is a front perspective view of the folded frame component 14, the frame 14 of course being folded along the hinges 20. FIG. 3 shows an end-on view of the folded frame close to its completely folded position, where it would be flatter and easier to store and transport in view of the fact that it would occupy very little space.

In FIG. 1 the open frame component 14 is located within a plastic bag, in this case a transparent plastic bag, although this is not necessary. The plastic bag, which is the container component 16, comprises an upper side 28 and a lower side 30. Each of the upper side 28 and lower side 30 has sides edges 32 and 34, and a base edge 36. The side edges 32 and 34 and based edge 36 of both the upper sides 28 and lower side 30 respectively are joined or sealed together so as to form a waterproof and airtight connection between the connection along these edges, between the upper side 28 and the lower side 30 respectively.

Each of the upper and lower sides 28 and 30 also has a top edge 38, the top edges 38 of the upper side 28 and lower side 30 not being connected to each other. As such, it will therefore be appreciated that the respective top edges 38 of the upper side 28 and lower side 30 can be moved away from each other so as to provide access to the space between the upper side 38 and lower side 30. This space can, of course, be expanded and contracted depending on the relative positions of the upper side 28 and lower side 30. This variable size space between the upper and lower sides 28 and 30 has reference numeral 40.

Near the top edge 38, a sealing mechanism 44 is provided so that the upper side 28 can be releasably sealed to the lower sided 30 by means thereof. These sealing mechanisms 44 may take many different forms, such as zippers, press seals and the like, as is well known from a variety of plastic bag products available on the market.

The frame component 14 may be stored or located within the container component 16, whether or not the frame component 14 is in the collapsed position as shown in FIG. 3, or the expanded position as shown in FIG. 1. When the frame component 14 is collapsed, so as to occupy as little space as possible, it may be placed within the container component 16 by inserting it into the space 40 through the open top edge 38 when the sealing mechanism 44 is open. Once installed, the container component 16 may be closed, after expelling the air in the conventional manner, and the container component 16 may be folded or wrapped around the frame component 14 so as to occupy a small size and serve as a convenient, flat, collapsed storage container, as will be described.

When the user desires to utilize the trough device 12, the sealing mechanism 44 is opened, as may be appropriate, and the top edges 38 of the upper side 28 and lower side 30 parted from each other so as to increase the size of the space 40. The folded frame component 14 is removed from the space 40 (assuming it was in the space 40 to start with—otherwise the frame component 14 is obtained from another storage area).

The frame component 14 is then moved from the substantially closed position, as shown in FIG. 2, to the open position or expanded position, as shown in FIG. 1, so as form an approximate square or rectangle. The open rectangle of the frame component 14 defines a region 50 bound by the inner surfaces 22 of each of the elongate strips 18. The opened or expanded frame component 14 is inserted into the space 40 of the container component 16, through the opening at the top edges 38, as is generally shown in the illustration of FIG. 1. The sealing mechanism 44 may be closed once the frame component 14 has been inserted into the space 40.

It will be seen that the surface area of each of the upper and lower sides 28 and 30 of the container component 16 is somewhat larger than the area defined by the perimeter of the elongate strips 18. In other words, the frame component 14, when inserted into the space 40, is not a tight fit, but rather there is excess surface on the upper and lower sides 38 and 30. With the frame component 14 within the container component 16, the upper surface 28 of the container component 16 may be patted or pushed down into the region 50, so as to form a trough or basin 54. This trough or basin 54 may then be filled with water, food or indeed anything else, depending on the needs and requirements of the user. In one configuration, the trough or basin 54 may be filled with water, thus operating as a temporary, portable water bowl which may be used by dog during a walk.

Once the purpose of configuring the trough device 12 has been completed, the container component 16 may be opened by unsealing the sealing mechanism 44, and the frame component removed, and folded into the collapsed position as shown in FIG. 2. The frame component, duly collapsed, may then be reinserted into the space 40, which, it should be noted, has not been exposed to any substances and would therefore be clean. If the trough or basin 54 contained only water, a light shaking of the container component 16 would expel most of the water from the surface and the frame component 14 can be once again stored within the space 40 of the container component 16, folded and transported in a flat condition which uses very little space.

It will be appreciated that the frame component 14 may have components which tend to maintain the frame component 14 in the substantially open or rectangular position. Often, this may be due to the nature of the hinge 20, so that the natural tendency of the frame component 14 would be to expand into the open position as being the most stable form of the frame component 14. Furthermore, it should also be noted that some type of closing tab or tie may be provided to keep the frame component 14 in the closed position. Alternatively, a simple rubber band or length of string may be used to tie the frame component so that it remains in the flat folded position as shown in FIG. 2, for convenience of storage.

In one form of the invention, each elongate strip may be approximately 1-3 inches in height, and 6-12 inches in length. As mentioned, the frame component 14 may have four equally dimensioned elongate strips 18, so that it opens up as a square, or it may open up as any rectangle when the elongate strips 18a and 18c are either longer than or shorted than the elongate strips 18b and 18d.

It should be appreciated that the invention is not to be seen as limited to any particular shape of open frame component 14. While the square or any rectangle have been described above, the frame component 14 may open up into a 5-, 6-, 8-sided or any other sided frame, or indeed it may be configured so as to open as a circle or somewhat elliptically. The actual shape of the frame component 14 when expanded or open will of course be determined by the physical characteristics of each strip 18 or the curve and natural resilience of the material.

The frame component 14 itself may be made of cardboard, plastic, thin metal or any other suitable material.

The bag itself will typically be made of plastic, although, depending upon the nature to which the trough device 12 may be used, it may be comprised of paper, or heat-resistant polymers or silicones.

An option available in the embodiment shown in FIGS. 1, 2 and 3 of the drawings is the possibility of creating a neck or small hole 56 in one, two or more spaces in the bag, to facilitate expulsion of air when desired. Clearly, however, the hole or neck 56 would be omitted from a bag when it is required to be water-tight or air-tight, in accordance with the function it is serving. Thus, when the invention, as will be described is used to form a cup, plate, pet-litter remover or urinal, the hole in the plastic material omitted.

Figure 4:
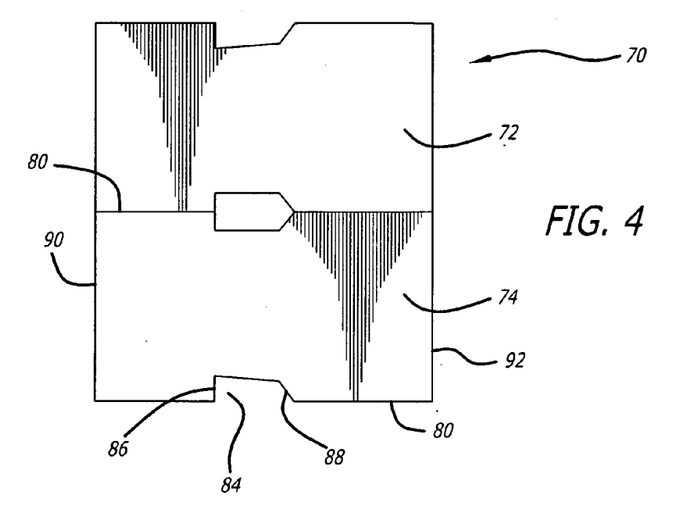
FIG. 4 is a side view of a further embodiment of a frame component in accordance with the invention, partially folded and showing two sides thereof.
Figure 5:
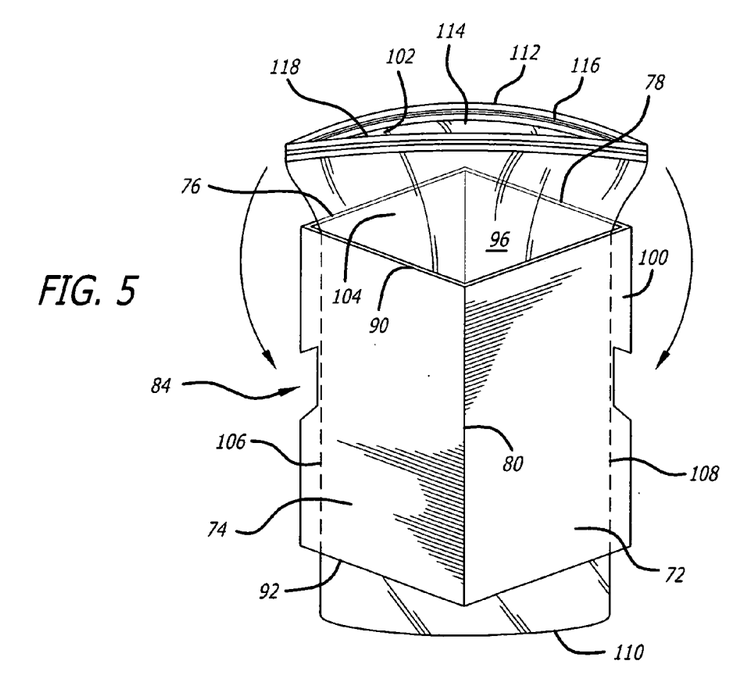
FIG. 5 is a perspective view of the frame component as shown in FIG. 4 of the drawings with a container component being assembled thereon.

Reference is now made to FIGS. 4 and 5 of the drawings in which there is shown an embodiment of the invention for forming a drinking cup or similar type of container. FIG. 4 shows the frame component 70 as a flat side view, including two panels 72 and 74. In FIG. 5 of the drawings the panel 76 and 78 can be seen with the four panels 72, 74, 76 and 78 being opened up into a three-dimensional configuration, to be discussed.

FIG. 4 shows the frame component 70 in the flat position with the panel 72 overlying the panel 78, and the panel 74 overlying the panel 76. This allows for convenient storage and transportation in a manner which takes up very little space.

The various panels 72, 74, 76 and 78 are separated from each other by hinges 80 which are lines of weakness, bends or other structural properties on the frame component 70 which allow demarcation of each panel and the folding of one panel relative to the others. It will be seen in FIG. 4 that the flat or folded position comprises, on the one hand, panels 72 and 74 in a horizontal plane relative to each other, overlying panels 76 and 78, also in a horizontal plane relative to each other. However, depending upon the construction of the hinges and the specific dimension of the panels 72, 74, 76 and 78, the configuration shown in FIG. 4 can be folded again along the hinges so that all of the panels overlie each other in book-like form. This would occupy less area, although the height of the stacked panels would be increased. Either folded configuration would fall within the scope of the invention.

Each of the panels 72, 74, 76 and 78 has a cut-out 84. Each cut-out has an upper edge 86 and a lower edge 88. Preferably, the upper edge of each cut out 84 at least has a slant or incline so that, as it moves away from hinge 80, it tapers or angles towards the top edge 90 of the frame component 70. Opposite the top edge 90 is the bottom edge 92.

The cut-out 84 in each panel registers with a corresponding cut-out on its adjacent panel so that the two together define a combined cut-out, as best seen in FIG. 5 of the drawings.

One difference between the embodiments illustrated in FIGS. 4 and 5 is that in FIG. 4 a cut-out is formed along all of the hinges separating the various panels. However, a modification can be seen in FIG. 5 where cut outs are formed only on opposing hinges, while the intermediate hinges have no such cut-outs. The number of cut-outs may be determined by the size and intended operation of the frame component 70. As will be described, the cut-outs are intended to secure the container component, and if such securing requires additional cut-outs due to the weight of the content that will be placed within the container component, the additional cut-outs may be formed.

With reference to FIG. 5 of the drawings, the frame component 70 substantially shown in FIG. 4 is opened from the flat stored position as shown in FIG. 4 to the open substantially three-dimensional configuration shown in FIG. 5. The open configuration results in the definition of a space 96 defined by the panels 72, 74, 76 and 78 which is substantially square or rectangular in cross-section. Any shape however may be used. The space 96 receives a container component 100 which is in most material respects identical to that shown in FIG. 1 of the drawings. In the embodiment shown in FIGS. 4 and 5 however, the container component 100 is located within the space defined by the frame component 70, as opposed to receiving the frame component therein. The container component 100 has a first side surface 102 and a second side surface 104 of substantially the same dimensions, and overlying each other along their edges, namely, side edge 106, side edge 108, base edge 110 and top edge 112. The side edges 106 and 108 and bottom edge 110 are sealed with respect to each other, while the top edge 112 is not sealed, and defines an opening 114.

The base edge 110 of the container component 100 is pulled through the space 96 from the top edge of the frame component 70 and down through and past the bottom edge 92. It will be seen in FIG. 5 that the bottom edge 110 of the container component extends below the level of the bottom edge 92 of the frame component 70.

Near the top edge 112 of the container component 100, there is a sealing mechanism 116 for opening and closing the region 118 between the first side surface 102 and the second side surface 104. In use, the top edge 112 is folded over the top edge 90 of the frame component 70, and pulled down the side of the frame component 70 on the outside thereof, and the sealing mechanism 116 is lodged within the cut-out 84. Preferably, the fit of the top edge 112 and sealing mechanism 116 around the outer periphery of the frame component 70 is fairly tight so that the sealing mechanism is engaged in the cut-out, and become lodged against the upper edge 86 thereof so that tugging or weight within the region 118 tends to secure the connection between the container component 100 and the frame component 70.

With the container component 100 firmly connected to the frame component 70, as described, with the sealing mechanism 116 preferably locked in the cut-out 84, the container component 100 is held in an open position over the rim defined by the top edge 90 of the frame component 70, and can be filled with water, other liquid, solid or any other substance desired, and convenient for the user.

Upon completion of use, the container component 100 can be disengaged from the frame component 70 by first removing the sealing mechanism 116 from the cut-outs 84, and thereafter removing the container component 100 from the top end, or through the bottom end, of the frame component 70. Since the container component 100 is likely to be soiled or used at this point, it can simply be discarded. Further, the frame component 70 can be folded, either in the form shown in FIG. 4, or so that all four panels overly each other in book-like form, and conveniently stored once more until needed for use. The frame component 70 will then be moved into the open position, and preferably a fresh bag used to attach thereto for the desired purpose.

If upon removal the container component 100 contains any substance such as if it has been used as a urinal, the bag can be adequately sealed at the top edges 112 by the sealing mechanism 116, and discarded as appropriate.

Figure 6:
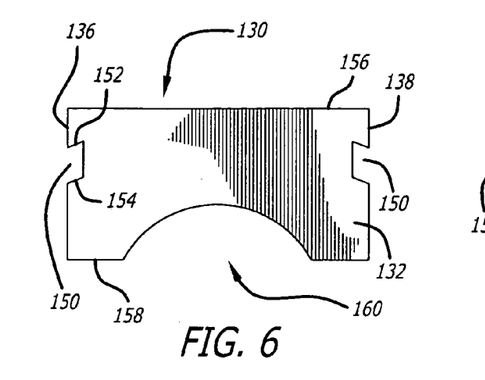
FIG. 6 is a first side view of a frame component in accordance with another aspect of the invention.
Figure 7:
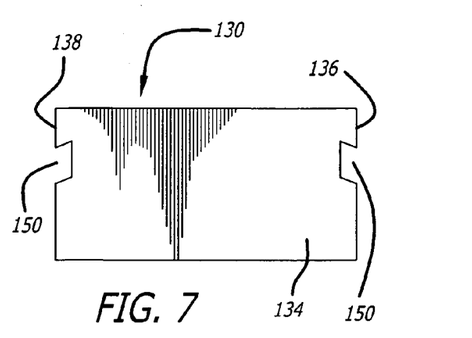
FIG. 7 is a side view of a frame component shown in FIG. 6 illustrating the other side thereof.
Figure 8:
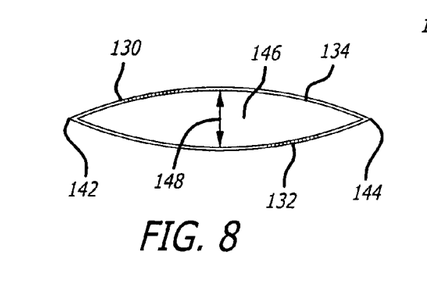
FIG. 8 is a top view of the frame component shown in FIG. 6.

Reference is now made to FIGS. 6 to 11 of the drawings which show a device intended for use as a portable toilet, preferably for hikers or for any person who anticipates being away from toilet facilities. In FIGS. 6 and 7 of the drawings, there is shown a frame component 130 comprised of two sides, the first side being shown in FIG. 6 with reference numeral 132, and the second side shown in FIG. 7 having reference numeral 134. The first and second sides 132 and 134 are connected together along their edges 136 and 138, the edge 136 and 138 connections forming a hinge. As will be seen from a top view of the frame component 130 in FIG. 8 of the drawings, the hinge 142 and hinge 144 are operable so that the sides 132 and 134 can flex away from each other to create a space 146 therebetween. Preferably, the construction of the frame component 130 would be such that, absent any bias to the frame component, the first and second sides 132 and 134 would tend towards the closed position so as to lie flat for storage, transportation and the like. When the fingers are used to squeeze the hinges 142 and 144, the first and second sides 132 and 134 would tend to part or move away from each other as shown by arrow 148 and releasing of the hinges would result in the opposite movement.

The frame component as will be seen in FIGS. 6 and 7 has cut-outs 150 where each of the first and second sides 132 and 134 abuts the hinges 142 and 144. Each cut-out has an upper edge 152 configured to slope towards the upper rim 156 of the frame component 130, and a lower edge 154, which may also slope. The cut-outs 150 on the first and second sides 132 and 134 of course register with each other so that the cut-outs on the first side 132 register with those on the second side 134.

The side 132 has carved in the lower rim 158 an arcuate cut-out 160 which may assist in the operation of the device, including the attachment and release of the container component, to be described, from the frame component 130.

Figure 9:
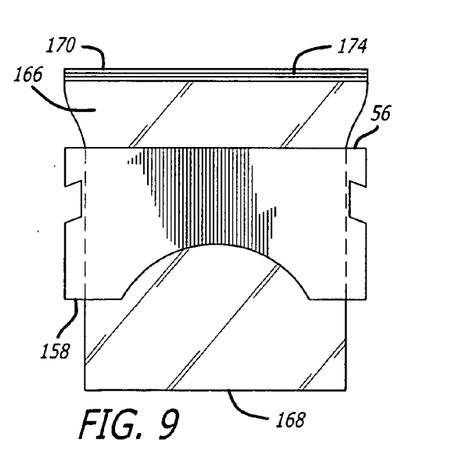
FIG. 9 is a side view of the frame component shown in FIG. 6 of the drawings, with a bag component being assembled thereon.

FIG. 9 of the drawings shows the container component 166 partially inserted in the space 146 defined between the first and second sides 132 and 134 when forced away from each other. The container component, as has been described with reference to previous embodiments, is of much the same shape and construction, and will therefore not be described in further detail at this point. However, it will be appreciated that the base 168 of the container component 166 is pulled through the space 146 so as to project below the lower rim 158 of the frame component 130. When inserted to the point shown in FIG. 9 of the drawings, the upper end 170 of the container component 166 projects above the upper rim 156, and the sealing mechanism 174 is folded on the outside of the frame component 130 and pulled down over the frame so that it engages within the cut-outs 150. The inclined upper edge 152 of the cut-out has the effect of securely engaging the sealing mechanism 174, so that when a weight is held within the container component 166, the pull or tug on the sealing mechanism 174 in fact enhances the connection and engages the frame component more thoroughly.

Figure 10:
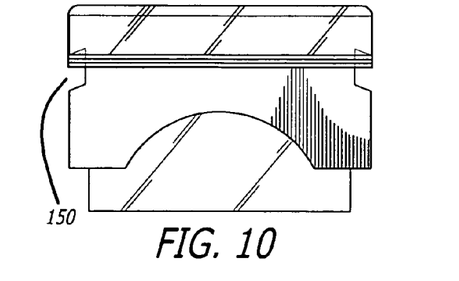
FIG. 10 is a side view as shown in FIG. 9, but with the container component fully assembled on the frame component.
Figure 11:
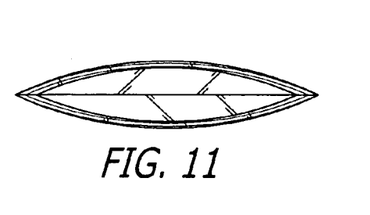
FIG. 11 is a top view of the frame component and bag component shown in FIG. 10.

FIG. 11 of the drawings shows the top view of the arrangement shown in FIG. 10 of the drawings. As will be seen in FIG. 11, the combined assembly of the frame component 130 and the container component 166 provides an opening which is suitable for operation as a urinal. The contents can be sealed using the sealing mechanism 174 on the container component 166, which is removed from the frame component and can be disposed of appropriately. As will be appreciated from the embodiment of the invention shown in FIGS. 6 to 11, as well as several of those already previously discussed, the frame in its operational position gives a degree of rigidity and stability to the bag, which is held in a position suitable for its intended purpose.

Figure 12:
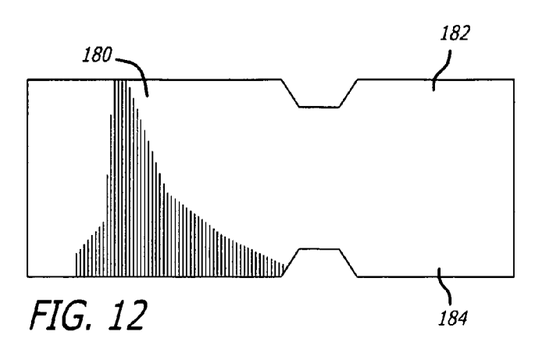
FIG. 12 is a side view of a frame component in accordance with yet a further embodiment of the invention.
Figure 13:
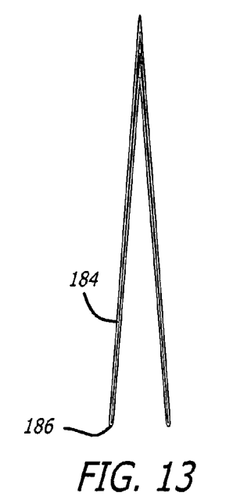
FIG. 13 is a side view of the substantially folded frame component as shown in FIG. 12 of the drawings.
Figure 14:
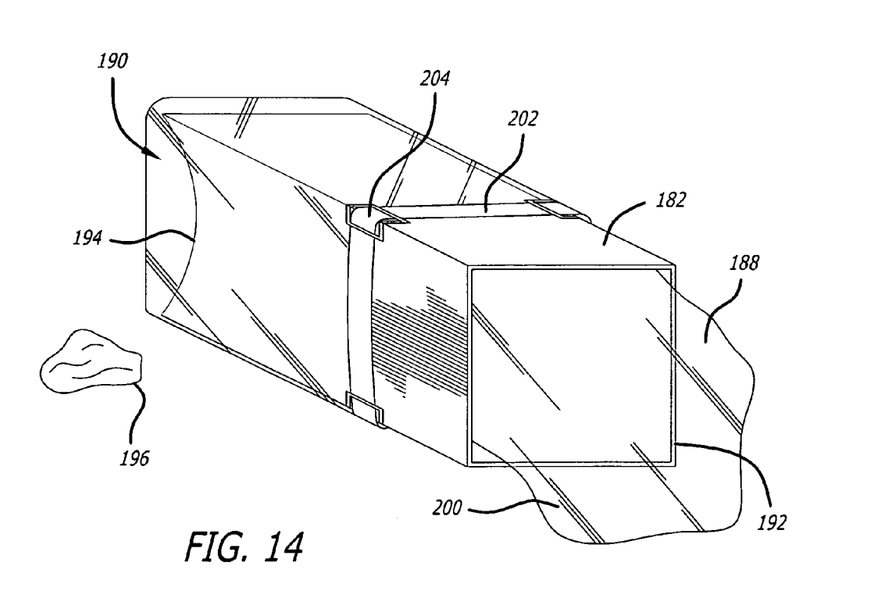
FIG. 14 is a perspective view of the opened frame component shown in FIG. 12 of the drawings including an assembled container component placed thereon, the combination being especially configured for picking up pet litter.

Reference is now made to FIGS. 12 to 14 of the drawings. In these Figures, the invention is modified into an embodiment suitable for picking up pet litter. FIG. 12 shows in side view a pet litter scoop 180 comprising a frame component 182 having four sides 184, which overlie each other in the folded position. FIG. 13 shows an end-on view illustrating the four sides in a substantially folded position, each of the sides connected to each other by hinges in a manner which has already been described and will not be repeated with respect to this embodiment. The frame component 182 can be unfolded from the position shown in FIG. 13, into that shown in FIG. 14, which shows a substantially 3-dimensional frame component defining a channel 188 extending from a front end 190 to a rear end 192. It will be seen in FIG. 14 that the front end 190 has a contoured edge 194 giving the frame component 182 a shovel-like configuration to facilitate the recovery of pet litter 196. When the frame component 182 has been unfolded into the expanded position, the container component 200 is located over the upper portion of the outside of the frame component 182 with the sealing mechanism 202 being received in notches 204 for enhanced connectivity, as has already been described. Upon recovery of the pet litter 196, into the container component 200, the user can remove the container component 200 and seal it with the contents, without having the contents of the container component 200 soil the frame component. The container component 200 has covered the frame component 182 at all relevant locations so that the frame component will not become soiled. Only the lower part of the inside of the container component 200 will become soiled, but this will never have to be touched, and can be sealed once the container component 200 has been removed from the frame component 182 and the sealing mechanism 202 closed to effectively seal the contents for appropriate disposal.

Furthermore, it will be appreciated that the frame component 182 when in the open position gives rigidity and stability to the container component 200, opening it widely and conveniently so that the pet litter 196 can easily be moved into the bag.

In, accordance with one embodiment of the device, the pet litter scoop 180 may for example have side panels which are about 12 to 14 cm in height and about 8 cm in width. However, the dimensions are not intended to be in any way limiting, and any suitable size device can be made, and multiple sizes may be available so that pet owners can select an appropriate pet litter scoop 180 according to the size of the dog.

Figure 15:
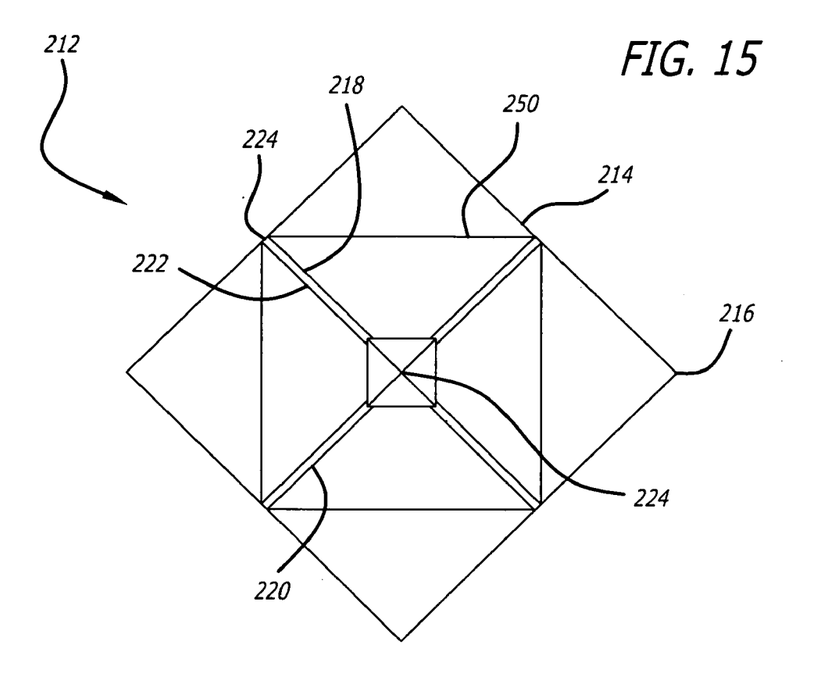
FIG. 15 is a top view of a frame component in accordance with yet a further embodiment of the invention, configured as a collapsible, portable stove.
Figure 16:
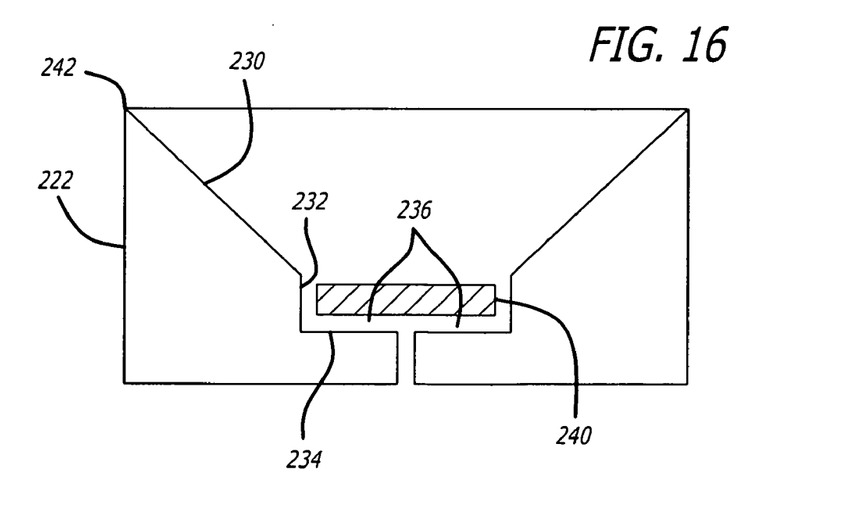
FIG. 16 is a side view of the opened frame component as shown in FIG. 15.

FIGS. 15 and 16 show a further use of the collapsible frame container of the invention, this time for use by campers as a possible portable stove. In FIG. 15, a top view of a portable stove 212 is shown, and the frame, in this embodiment, consists of four similar sized outer panels 214 connected at hinges 216 which bend so that the portable stove 212 can be folded into a flat position. Extending from approximately the midpoint of each of the outer panels 214, there are two support walls 218 and 220. These are identical mirror images of each other. The first support wall 218 comprises a V-shaped wall 222 connected to the outer panels 214 at approximately the midpoint 224 thereof. Each of the V-shaped walls 222 folds at a point 224, and the points 224 of each of the support walls 218 and 220, when the portable stove 212 is in the open position, meet more or less at the center of the area defined by the outer panels 214.

Each of the V-shaped walls 22 comprises an angled portion 230, a vertical portion 232, and a horizontal portion 234, as best seen in FIG. 16 of the drawings. The horizontal portion 234 of the respective V-shaped walls define a surface 236 upon which a heating element 240 which may be a fuel square rests. In this particular embodiment, the portable stove would clearly be comprised of a metal, since it would have to be able to tolerate substantial heat without melting or burning.

In one form, the portable stove may have mounted thereon a container component 242 which is suspended over the top rim of the container and reaches down into the space over the heating element 240. The container component 242 would receive liquid or solid food, and would be positioned over the heating element 240 so as to receive heat therefrom.

It follows from the above that the heating element and the material which forms the container component 242 would have to be carefully selected. The container component 242 would of course not be comprised of regular plastic but would be comprised of some form of heat resistant material which is able to sustain temperatures up to that provided by the heating element 240, without burning or melting.

Once the container stove has been used for its desired purpose, the container component 242 is simply removed and appropriately discarded since it is likely to be soiled from the food, while the portable stove frame portion is allowed to cool, to be folded into a flat condition for easy storage and subsequent transportation. In one embodiment, the portable stove 212 may include foldout stabilizing struts 250 which provide added stability to the frame when in the open position. However, these struts are optional and may be omitted, depending upon the nature and construction of the portable stove 212.

Figure 17:
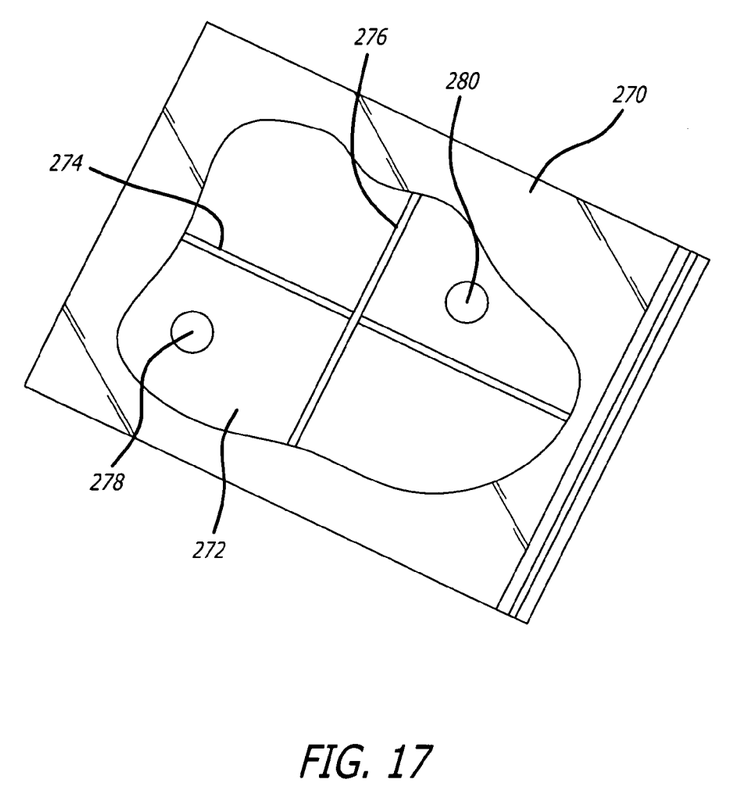
FIG. 17 is a perspective view of a frame component shown inside a bag component in accordance with a further embodiment of the invention, the frame component and bag component being dimensioned and configured so as to operate as a urinal.
Figure 18:
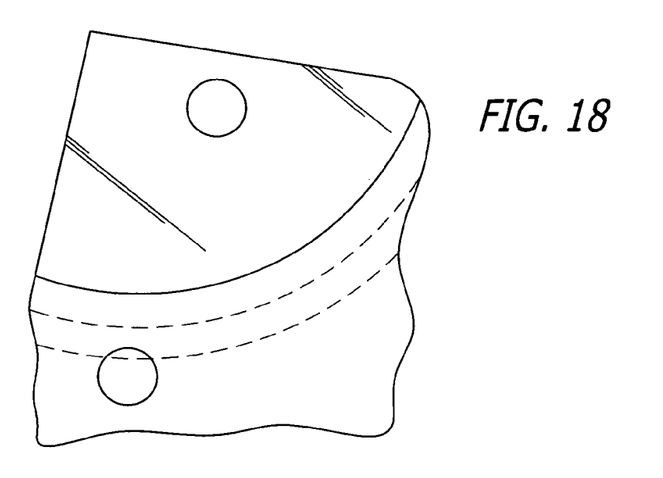
FIG. 18 is a perspective view of the frame component and bag component shown in FIG. 17 of the drawings, partially assembled.
Figure 19:
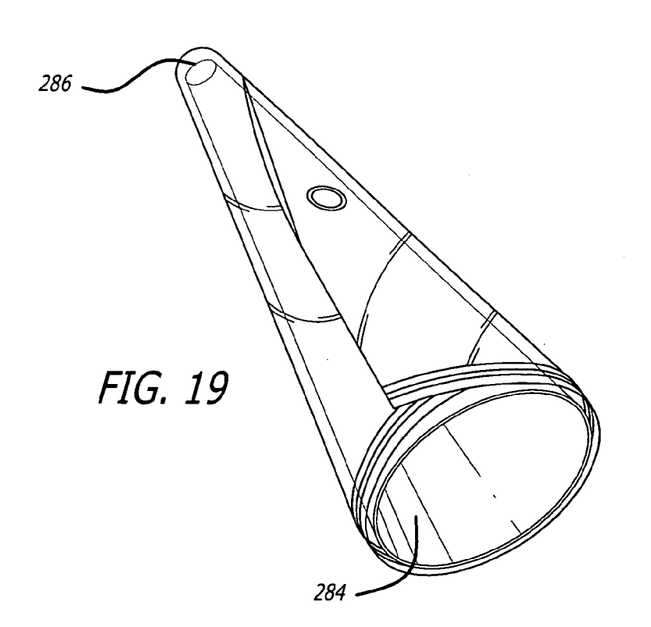
FIG. 19 is a perspective view of the frame component and bag competent as shown in FIG. 17 of the drawings, in a substantially assembled and usable configuration.

Reference is now made to FIGS. 17, 18 and 19 of the drawings which show another embodiment of the invention, again a portable urinal device. In FIG. 17, there is shown a container component 270 of the type already discussed above, the details of which will not be repeated at this point, which contains a frame component 272. The frame component, as will be seen in FIG. 17 has a particular shape, with vertical and horizontal hinges 274 and 276 respectively. These hinges 274 and 276 divide the frame component 272 into four unequal areas, and in diagonally opposing areas there are formed apertures 278 and 280. The frame component 274 can either be stored in the bag as shown in FIG. 17 in its open position, or can be flattened, by folding along the hinges 274 and 276, a schematic representation of which is shown in FIG. 18 of the drawings.

It will be seen that the apertures 278 and 280 on the frame component are positioned such that when the frame competent is somewhat rolled, and the apertures 278 and 280 are superimposed with respect to each other, the frame component forms a funnel-shaped object as shown in FIG. 19 of the drawings. The user can hold the frame component 272 by means of the apertures 278 and 280 in the funnel-type shape by inserting a finger through the superimposed apertures 278 and 280. In this position, the funnel has an open end 284, and a smaller open end 286 at the opposite end thereof. The user is able to discharge urine into the open end 284, which provides a convenient larger opening, which flows through the funnel and through the opening 286. Since the funnel would be located within the container component 270, the contents will be sealed therein by means of the sealing mechanism, and may be appropriately disposed of thereafter.

The invention provides a wide selection of different configurations useful for many different activities, as will be appreciated from the above descriptions. The collapsible frame container of the invention makes it convenient to simply fold a frame and place it inside a sealable bag, widely available on the market, seal the bag after discharging air therefrom, and having a small portable container which can be expanded at a later time for use. Since container components are more likely to be disposed of than the frame component, a single frame component may come as a kit with multiple container components.

Some dimensions have been provided above for specific embodiments. However, it must be appreciated that the invention is not dimension-specific, and any particular frame component as well as its associated container component, may be sized and configured depending upon the nature of the operation or function it is intended to perform. The invention is useful for people walking dogs, people with young children who may have need for a portable potty in certain circumstances, and the frame may be usable not only with sealable bags, but also with conventional plastic grocery bags.

In the embodiment described above where the invention can be used as hiker's stove, an "oven-safe" polymer plastic bag or especially molded silicone bag capable of withstanding temperatures of up to 600 degrees would clearly be utilized so as to safely cook foods in water and avoid direct flames from contacting the bag.

The invention has many different applications, dimensions and sizes, and is not limited by the various embodiments discussed herein.

The invention claimed is:

1. A collapsible frame container assembly comprising:
a frame component comprising a plurality of panels connected to each other, the panels being movable relative to each other between a first substantially folded condition wherein the panels are collapsed and a second unfolded condition wherein the panels are opened to define a frame structure having a trough region;
a container component comprising first and second sides defining a space therebetween of a size which can be varied according to the relative positions of the first and second sides and for receiving the frame component when in the second unfolded condition, the frame component when in the unfolded condition and the container component being releasably coupled to each other in a manner whereby a portion of the container component is received in the trough region of the frame component so as to define therein a receptacle in the configuration of a hollow depression for receiving substances and the frame component is separated from the receptacle by at least one of the first and second sides of the container component to prevent substances from coming into contact with the frame.

2. A collapsible frame container assembly as claimed in claim 1 wherein the frame component comprises four elongate strips, each separated from each other by a fold, the four elongate strips when in the second unfolded condition, defining a four-sided structure.

3. A collapsible frame container assembly as claimed in claim 2 wherein the container component has four edges and the first and second sides are connected to each other on three edges thereof, a fourth edge being open and configured so as to receive the frame component at least in the second, unfolded condition.

4. A collapsible frame container assembly as claimed in claim 2 wherein the fourth edge of the container component has a sealing means for releasably sealing the fourth edge when the frame component is in the space.

5. A collapsible frame container assembly as claimed in claim 2 wherein the container component is of larger dimension than the frame component so that the frame component can be received therein, and either the first and second sides of the container component, or a portion thereof, is received within a frame space defined by the frame component when in the second unfolded condition, so as to form a basin therein.

6. A collapsible frame container assembly as claimed in claim 2 wherein the four elongate strips, when in the second unfolded condition, form a shape consisting of one of the following: square, rectangle, parallelogram.

7. A collapsible frame container assembly as claimed in claim 1 wherein the frame component comprises four panels which, in the second unfolded condition, define a frame space having an open upper end and an open lower end, the container component being received within the frame space.

8. A collapsible frame container assembly as claimed in claim 7 wherein the four panels are separated from each other by longitudinal folds.

9. A collapsible frame container assembly as claimed in claim 8 further comprising at least one cut-out formed at a fold, and extending into adjacent panels.

10. A collapsible frame container assembly as claimed in claim 9 wherein the cut-out has an upper edge and a lower edge, the upper edge being angled so that as it extends along a panel it is angled towards the open upper end of the frame component.

11. A collapsible frame container assembly as claimed in claim 9 wherein there are at least two cut-outs, and the container component has an open edge which folds over the upper open end of the frame component, the open edge being firmly received within the cut-outs so as to secure the container component to the frame component.

12. A collapsible frame container assembly as claimed in claim 1 wherein the frame component comprises two panels which overlie each other and are connected at ends thereof by a fold, the panels being comprised of a resilient material.

13. A collapsible frame container assembly as claimed in claim 12 wherein the frame component has a frame space and an open upper end and an open lower end, and the container component is received within the frame space of the frame component extending from the open upper end at least to the open lower end.

14. A collapsible frame container assembly as claimed in claim 12 wherein the frame component has along the fold thereof a cut-out extending from the fold into adjacent panels.

15. A collapsible frame container assembly as claimed in claim 14 wherein the cut-out has an upper edge which is angled towards the upper open end.

16. A collapsible frame container assembly as claimed in claim 15 wherein the container component folds over the open upper end of the frame component and extends down the outside thereof, the open end of the container component being received within the cut-out.

17. A collapsible frame container assembly as claimed in claim 7 wherein the frame component has an upper edge at the upper end thereof, the upper edge being contoured at least along a portion thereof to operate as a scoop.

18. A collapsible frame container assembly as claimed in claim 1 wherein the frame component is movable between a substantially flat position, which comprises the first folded condition, and a second unfolded condition, configured as a funnel-shaped member, the funnel-shaped member receiving the container component.

19. A collapsible, frame container assembly as claimed in claim 18 wherein the frame component has two apertures formed thereon, the apertures being located on the frame component such that when the apertures are superimposed, the frame component will assume the funnel-shaped configuration.

20. A collapsible frame container assembly as claimed in claim 19 wherein the apertures are dimensioned so as to receive a finger of a user to facilitate holding of the frame component in the funnel-shaped condition.

21. A collapsible frame container assembly as claimed in claim 1 wherein the frame component comprises four panels, each separated by a fold, and further comprises a plurality of foldable, inwardly extending support arms, which extend towards a center of a frame space defined by the frame component when in the second, unfolded condition, the support arms defining a support surface along at least a portion of their length.

22. A collapsible frame container assembly as claimed in claim 21 wherein the frame component is comprised of a metal or other suitable material able to withstand high temperatures.

23. A collapsible frame container assembly as claimed in claim 22 wherein the container component fits over an upper edge of the frame component and extends into the frame component up to a depth such that the container component is positioned over the support surface.

\* \* \* \* \*